(12) United States Patent
Im

(10) Patent No.: US 7,872,694 B2
(45) Date of Patent: Jan. 18, 2011

(54) ELECTRICALLY-DRIVEN LIQUID CRYSTAL LENS AND STEREOSCOPIC DISPLAY DEVICE USING THE SAME

(75) Inventor: Hee Jin Im, Anyang-si (KR)

(73) Assignee: LG Display Co., Ltd, Seoul (KR)

( * ) Notice: Subject to any disclaimer, the term of this patent is extended or adjusted under 35 U.S.C. 154(b) by 143 days.

(21) Appl. No.: 12/289,152

(22) Filed: Oct. 21, 2008

(65) Prior Publication Data

US 2009/0122210 A1 May 14, 2009

(30) Foreign Application Priority Data

Oct. 22, 2007 (KR) .................. 10-2007-0106013

(51) Int. Cl.
*G02F 1/1335* (2006.01)

(52) U.S. Cl. .................. 349/15; 349/200; 349/33

(58) Field of Classification Search .................. 349/200, 349/15, 16, 11, 33; 359/376, 378
See application file for complete search history.

(56) References Cited

U.S. PATENT DOCUMENTS

| 4,909,626 | A |  | 3/1990 | Purvis et al. | |
|---|---|---|---|---|---|
| 5,493,427 | A | * | 2/1996 | Nomura et al. | 349/5 |
| 5,600,456 | A | * | 2/1997 | Maruyama et al. | 349/64 |
| 5,751,471 | A | * | 5/1998 | Chen et al. | 359/319 |
| 6,191,881 | B1 | * | 2/2001 | Tajima | 359/254 |
| 6,512,563 | B1 | * | 1/2003 | Tajima | 349/123 |
| 2006/0098296 | A1 | * | 5/2006 | Woodgate et al. | 359/642 |
| 2006/0146208 | A1 |  | 7/2006 | Kim | |
| 2007/0195409 | A1 | * | 8/2007 | Yun et al. | 359/462 |
| 2008/0151168 | A1 | * | 6/2008 | Sekiguchi | 349/142 |
| 2009/0015737 | A1 |  | 1/2009 | Jung et al. | 349/15 |
| 2009/0015739 | A1 |  | 1/2009 | Shin et al. | 349/15 |
| 2009/0122210 | A1 | * | 5/2009 | Im | 349/15 |

FOREIGN PATENT DOCUMENTS

| CN | 101025490 | 8/2007 |
|---|---|---|
| EP | 1 816 507 | 8/2007 |
| KR | 10-2007-0082109 | 8/2007 |

\* cited by examiner

*Primary Examiner*—Brian M Healy
(74) *Attorney, Agent, or Firm*—McKenna Long & Aldridge LLP

(57) ABSTRACT

An electrically-driven liquid crystal lens, which can achieve not only a gentle parabolic lens plane when being realized via alignment of liquid crystals based on a changed electrode configuration, but also a reduced cell gap of a liquid crystal layer and a stable profile even in a large-area display device, and a stereoscopic display device using the same are disclosed.

17 Claims, 11 Drawing Sheets

ELECTRICALLY-DRIVEN LIQUID CRYSTAL LENS AND STEREOSCOPIC DISPLAY DEVICE USING THE SAME

This application claims the benefit of the Korean Patent Application No. P2007-106013, filed on Oct. 22, 2007, which is hereby incorporated by reference for all purposes as if fully set forth herein.

BACKGROUND OF THE INVENTION

1. Field of the Invention

The present invention relates to a display device, and more particularly, to an electrically-driven liquid crystal lens, which can achieve not only a gentle parabolic lens plane when being realized via alignment of liquid crystals based on a changed electrode configuration, but also a reduced cell gap of a liquid crystal layer and a stable profile even in a large-area display device, and a stereoscopic display device using the same.

2. Discussion of the Related Art

At present, services for rapid dissemination of information, constructed on the basis of high-speed information communication networks, have developed from a simple "listening and speaking" service, such as current telephones, to a "watching and listening" multimedia type service on the basis of digital terminals used for high-speed processing of characters, voice and images, and are expected to be ultimately developed into cyberspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference between images due to the positional difference of the eyes is called binocular disparity. A 3-dimensional stereoscopic image display device is designed on the basis of binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately fuses the images, giving the impression of real 3-dimensional images. This ability is conventionally called stereography, and a stereoscopic display device is obtained by applying stereography to a display device.

A stereoscopic display device may be classified based on constituent elements of a lens which realizes 3-dimensional images. As one example, there is an electrically-driven liquid crystal lens wherein a liquid crystal layer constitutes a lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. With polarization, when liquid crystal molecules are under the influence of an electric field, electric charges in the liquid crystal molecules are gathered to opposite sides of the liquid crystal molecules, whereby a molecular arrangement direction is altered according to the electric field. With optical anisotropy, owing to an elongated shape of liquid crystal molecules and the above-mentioned molecular arrangement direction, the path or polarization of light to be emitted is changed according to the incidence direction or polarization of incident light.

Accordingly, the liquid crystal layer has a difference in transmissivity by voltages applied to the two electrodes, and an image can be displayed using the transmissivity difference of pixels.

Recently, there has been proposed an electrically-driven liquid crystal lens wherein a liquid crystal layer serves as a lens using the above-described characteristics of liquid crystal molecules.

Specifically, a lens is designed to control the path of incident light on a per position basis using a difference between an index of refraction of a lens constituent material and an index of refraction of air. In the electrically-driven liquid crystal lens, if different voltages are applied to the liquid crystal layer according to different positions of electrodes so as to drive the liquid crystal layer by different electric fields, incident light introduced into the liquid crystal layer causes different phase variations on a per position basis and as a result, the liquid crystal layer can control the path of incident light in the same manner as an actual lens.

Hereinafter, a related art electrically-driven liquid crystal lens will be described with reference to the accompanying drawings.

FIG. 1 is a sectional view illustrating a related art electrically-driven liquid crystal lens, and FIG. 2 is a view illustrating electric potential distribution upon formation of the electrically-driven liquid crystal lens of FIG. 1 after voltages are applied to the liquid crystal lens.

As shown in FIG. 1, the related art electrically-driven liquid crystal lens includes first and second substrates 10 and 20 opposite each other, and a liquid crystal layer 30 formed between the first substrate 10 and the second substrate 20.

Here, first electrodes 11 are arranged on the first substrate 10 with a first interval. In this case, with relation to the neighboring first electrodes 11, a distance from the center of one of the first electrodes 11 to the center of the next first electrode 11 is called "pitch". Repeating the same pitch for the respective first electrodes results in a pattern.

A second electrode 21 is formed over the entire surface of the second substrate 20 opposite the first substrate 10.

The first and second electrodes 11 and 21 are made of transparent metals. The liquid crystal layer 30 is formed in a space between the first electrodes 11 and the second electrode 21. Liquid crystal molecules of the liquid crystal layer 30 respond to the strength and distribution of an electric field and have a phase distribution similar to that shown in FIG. 2.

The above-described electrically-driven liquid crystal lens is realized based on an assumption that high voltages are applied to the first electrode 11 and the second electrode 21 is grounded. With this voltage condition, a vertical electric field is strongest at the center of the first electrode 11, and the strength of the vertical electric field decreases away from the first electrode 11. Accordingly, when the liquid crystal molecules of the liquid crystal layer 30 have positive dielectric constant anisotropy, the liquid crystal molecules are arranged according to the electric field in such a way that they are upright at the center of the first electrode 11 and are gradually tilted horizontally away from the first electrode 11. As a result, in view of light transmission, an optical path is shortened at the center of the first electrode 11, and is lengthened with increasing distance from the first electrode 11, as shown in FIG. 2. Representing the length variation of the optical path using a phase plane, the electrically-driven liquid crystal lens has light transmission effects similar to a parabolic lens.

Here, the second electrode 21 causes the behavior of an electric field, making an index of refraction generally take the form of a spatial parabolic function and the first electrodes 11 define edge regions of the lens.

In this case, relatively high voltages are applied to the first electrodes 11 than the second electrode 21. Therefore, as shown in FIG. 2, an electric potential difference occurs between the first electrodes 11 and the second electrode 21. In particular, a steep horizontal electric field is created around the first electrodes 11. Accordingly, liquid crystals molecules have a slightly distorted distribution rather than a gentle distribution, whereby an index of refraction cannot exhibit parabolic spatial distribution, or movement of the liquid crystals is excessively sensitive to voltage variation.

The above-described related art electrically-driven liquid crystal lens can be realized, without a physical parabolic lens, by arranging electrodes on two substrates with liquid crystals interposed therebetween and applying voltages to the electrodes.

However, the above-described electrically-driven liquid crystal lens has the following problems.

First, since electrodes formed on a lower substrate occupy an extremely partial area of a lens region, a steep horizontal electric field, rather than a gentle electric field, is created between a lens edge region corresponding to the electrodes and a lens center region distant from the lens edge region, resulting in a slightly distorted phase of the electrically-driven liquid crystal lens. In particular, in the electrically-driven liquid crystal lens wherein high voltages are applied to a limited number of electrodes in each lens region, the greater the pitch of the lens region, an insufficient electric field is created between the high voltage electrodes and substrates opposite each other. Accordingly, formation of the electrically-driven liquid crystal lens having a gentle parabolic lens plane having the same optical effects as an actual lens is extremely difficult.

Second, when being applied to a large-area display device, the lens center region, which is distant from the lens edge region where the electrodes, to which a high-voltage is applied, are located, is unaffected by an electric field and has difficulty in alignment control of liquid crystals by the electric field. This causes a serious distortion in lens shape based on the electric field. As occasion demands, when control in the lens center region is difficult or impossible, the resulting electrically-driven liquid crystal lens has a discontinuous lens profile and is ineffective as a lens.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An advantage of the present invention is to provide an electrically-driven liquid crystal lens, which can achieve not only a gentle parabolic lens plane when being realized via alignment of liquid crystals based on a changed electrode configuration, but also a reduced cell gap of a liquid crystal layer and a stable profile even in a large-area display device, and a stereoscopic display device using the same.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an electrically-driven liquid crystal lens comprises: first and second substrates arranged opposite each other and each defining an active region including a plurality of lens regions and a pad region at the outer side of the active region; a plurality of first electrodes formed on the first substrate to correspond to the respective lens regions and spaced apart from one another by different distances between the centers of the neighboring first electrodes in each lens region; a second electrode formed over the entire surface of the second substrate; a voltage source to apply different voltages to the plurality of first electrodes and to apply a ground voltage to the second electrode; and a liquid crystal layer filled between the first substrate and the second substrate.

Some of the plurality of first electrodes in each lens region, to which relatively high voltages are applied, may have a shorter distance between the centers of the neighboring first electrodes than a distance between the centers of the neighboring first electrodes to which relatively low voltages are applied. In this case, a width of the first electrodes may be gradually increased or the distance between the first electrodes may be gradually increased from a relatively high voltage applying region to a relatively low voltage applying region.

The voltage source may include a distributed-voltage generator to create different voltages upon receiving minimum and maximum voltages applied thereto, in order to apply the different voltages to the plurality of first electrodes. In this case, the electrically-driven liquid crystal lens may further comprise: a plurality of metal lines provided in the pad region, and voltage signals, output from the distributed-voltage generator, may be applied to the plurality of metal lines in the pad region, respectively, and the plurality of metal lines may have contacts with ends of the plurality of first electrodes.

The plurality of first electrodes may be formed in a given direction in parallel, and the metal lines may be formed in the pad region to intersect with the first electrodes, each of the metal lines having a contact with at least one of the plurality of first electrodes. The number of the voltage signals output from the distributed-voltage generator may be equal to the number of the first electrodes located between the edge and the center of each lens region.

The voltage signals output from the distributed-voltage generator may correspond to a positive quadratic function based on the center of each lens region.

The distributed-voltage generator may include: resistors provided between maximum and minimum voltage input terminals and voltage signal output terminals, to distribute voltage signals between maximum and minimum voltages; and buffers between the respective voltage signal output terminals and the metal lines in the pad region.

The plurality of first electrodes may be formed on the first substrate in the same layer.

Alternatively, the electrically-driven liquid crystal lens may further comprise: at least one insulating film formed on the first substrate. In this case, the plurality of first electrodes may be formed on the first substrate and on the insulating film such that the first electrodes are horizontally symmetrical on the basis of the edge in each lens region.

The plurality of first electrodes may have a bar shape extending in a crosswise direction of the first substrate, and a width of the first electrodes and a distance between the neighboring first electrodes may be variable in a range of 2 μm to 30 μm.

The electrically-driven liquid crystal lens may further comprise: a first alignment film formed on the first substrate including the plurality of first electrodes; and a second alignment film formed on the second electrode. The first alignment film may have the same rubbing direction as a longitudinal direction of the first electrodes, and the second alignment film may have a rubbing direction intersecting with the rubbing direction of the first alignment film.

The first and second electrodes may be made of transparent metals.

In accordance with another aspect of the invention, there is provided a stereoscopic display device comprising: a display panel provided below the electrically-driven liquid crystal lens, to transmit 2-dimensional image signals to the electrically-driven liquid crystal lens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
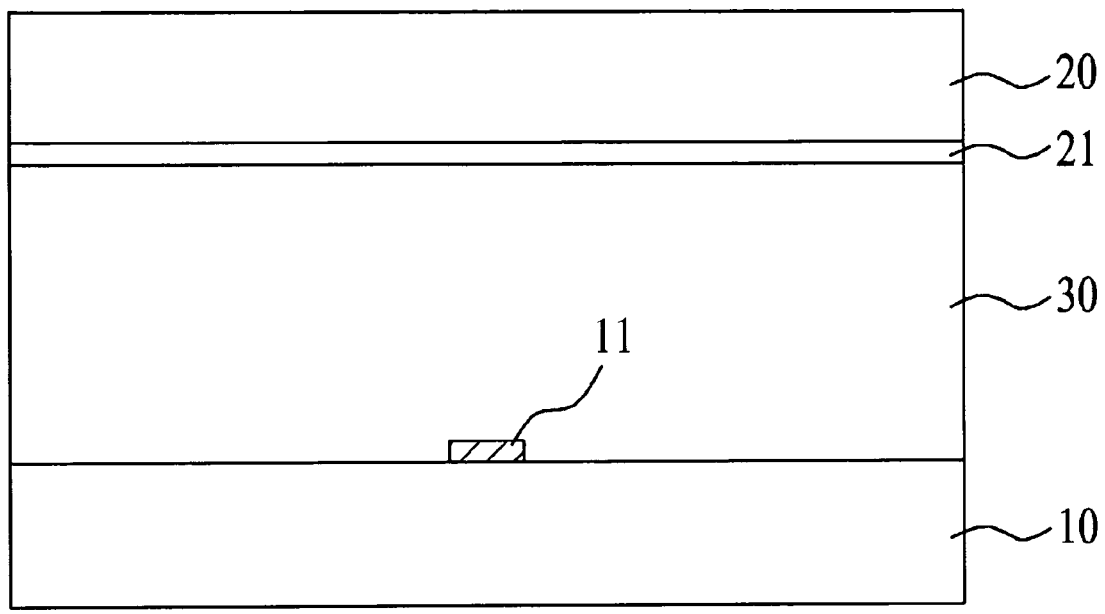
FIG. 1 is a sectional view illustrating a related art electrically-driven liquid crystal lens.
Figure 2:
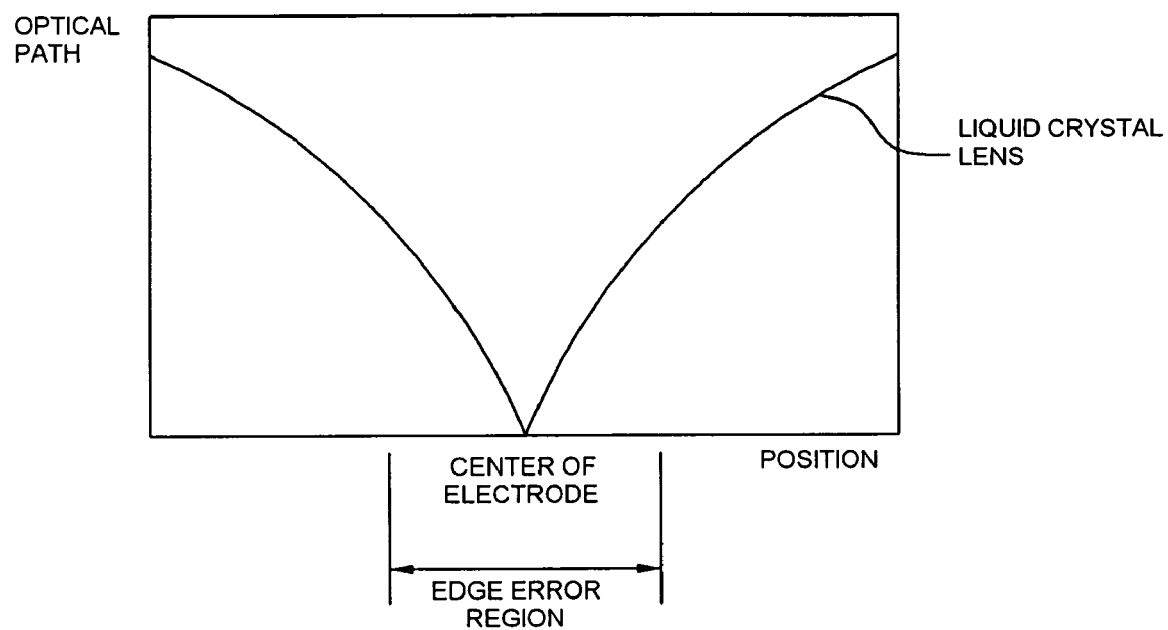
FIG. 2 is a graph illustrating an optical path (phase variation) according to a given position of the electrically-driven liquid crystal lens shown in FIG. 1.
Figure 3:
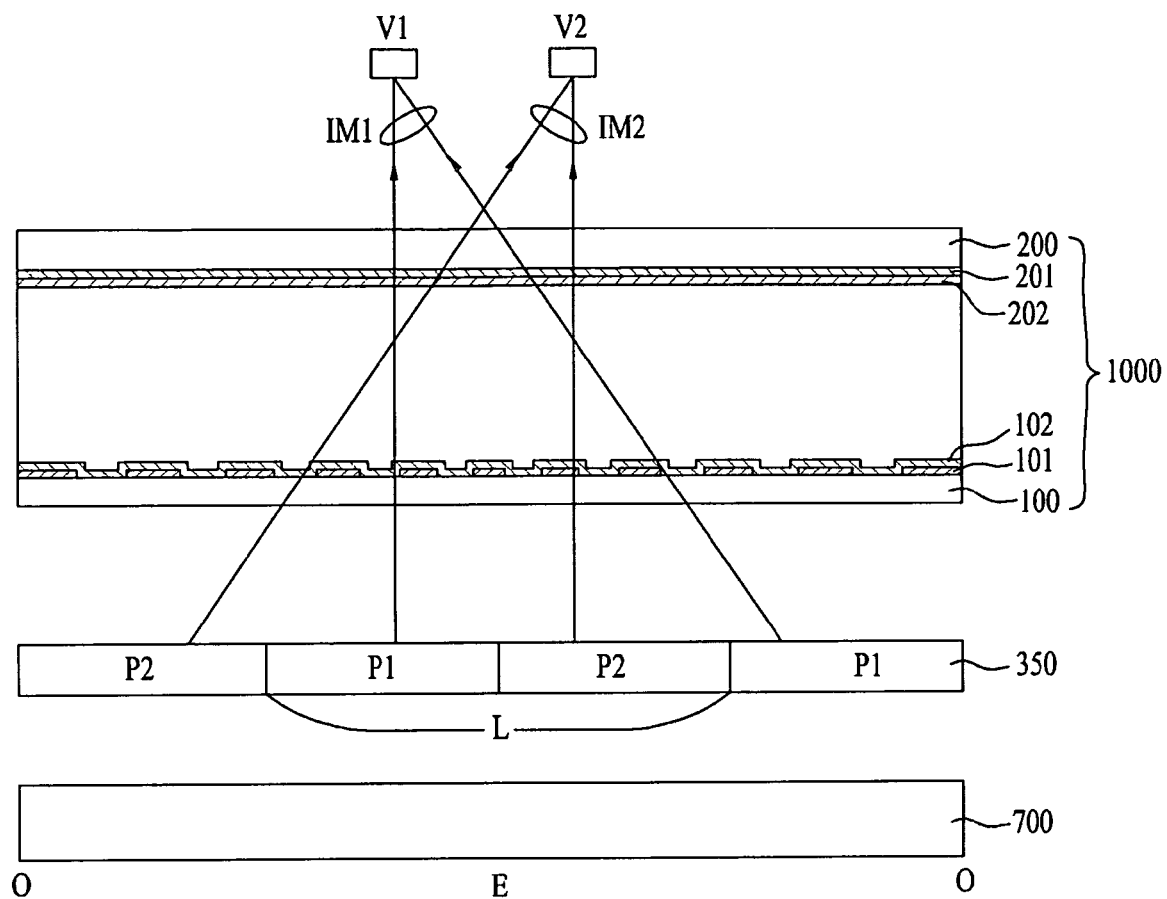
FIG. 3 is a sectional view illustrating a stereoscopic display device using an electrically-driven liquid crystal lens according to a first embodiment of the present invention.
Figure 4:
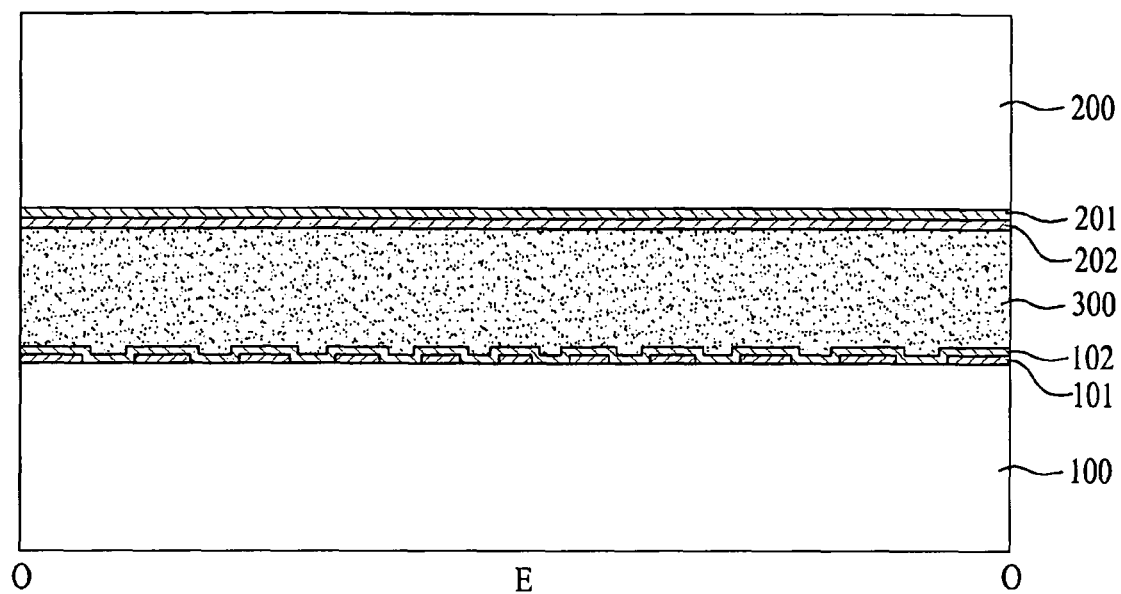
FIG. 4 is a sectional view illustrating the electrically-driven liquid crystal lens of FIG. 3.
Figure 5:
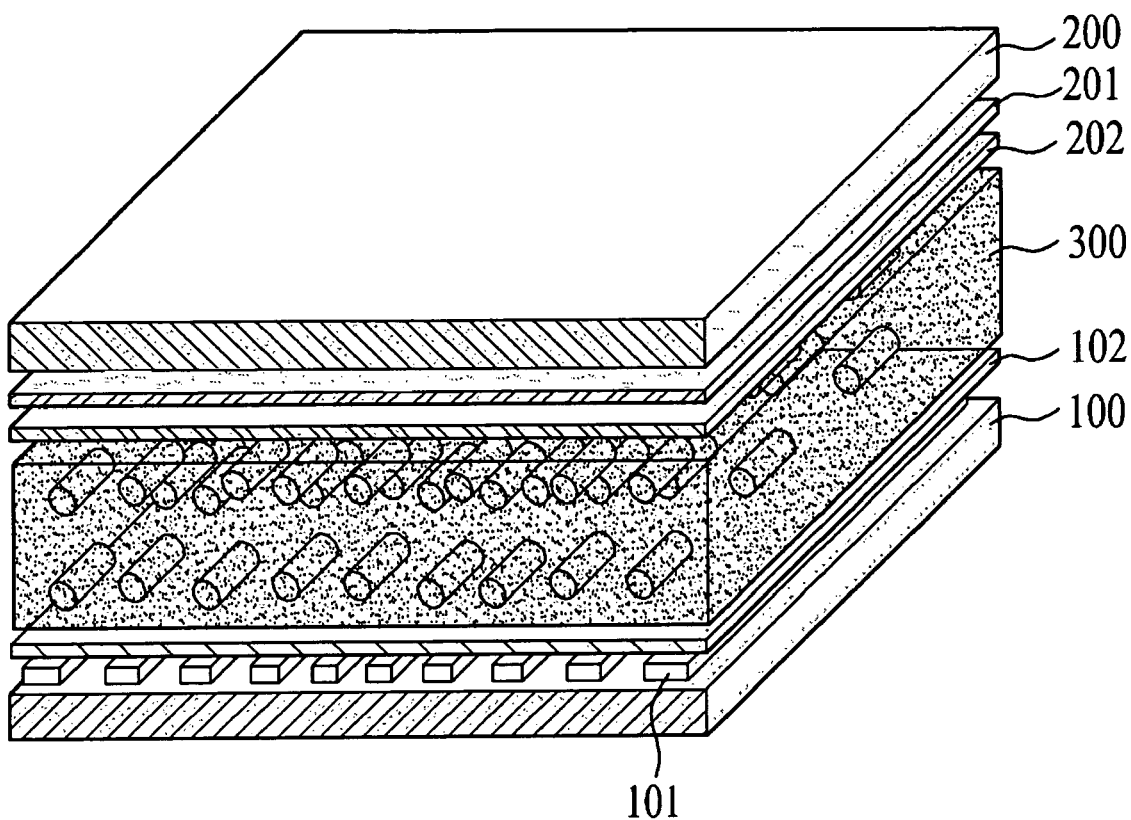
FIG. 5 is a perspective view illustrating the electrically-driven liquid crystal lens of FIG. 3.

FIG. 3 is a sectional view illustrating a stereoscopic display device including an electrically-driven liquid crystal lens according to a first embodiment of the present invention. FIGS. 4 and 5 are a sectional view and a perspective view, respectively, illustrating the electrically-driven liquid crystal lens of FIG. 3.

As shown in FIG. 3, the stereoscopic display device according to a first embodiment of the present invention includes an electrically-driven liquid crystal lens 1000, which is driven upon receiving voltages to thereby function as a lens, a display panel 350, which is disposed below the electrically-driven liquid crystal lens 1000 and serves to emit 2-dimensional image information, and a light source 700, which is disposed below the display panel 350 and serves to direct light to the display panel 350.

As occasion demands, if the display panel 350 is a self-illuminating device, such as an organic light emitting display device, omission of the light source 700 is possible.

The display panel 350 contains first and second image pixels P1 and P2 alternately and repeatedly arranged to display first and second images IM1 and IM2, respectively. The display panel 350 can be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 1000, and serves to transmit 2-dimensional image signals to the electrically-driven liquid crystal lens 1000.

The electrically-driven liquid crystal lens 1000 according to the present invention functions to emit 3-dimensional image signals from 2-dimensional image signals according to a lens profile, and is located above the display panel 350 that forms 2-dimensional images. The electrically-driven liquid crystal lens 1000 may emit 3-dimensional image signals, or may directly emit 2-dimensional image signals according to whether or not voltages are applied thereto. Specifically, the electrically-driven liquid crystal lens 1000 is designed to directly transmit light when no voltage is applied thereto and thus, can serve as a switching device to display 2-dimensional images when no voltage is applied thereto and display 3-dimensional images when voltages are applied thereto.

Hereinafter, the electrically-driven liquid crystal lens 1000 will be described in more detail.

As shown in FIGS. 3 and 4, the electrically-driven liquid crystal lens 1000 according to the first embodiment of the present invention includes first and second substrates 100 and 200 arranged opposite each other and each defining a plurality of lens regions to correspond to those of the other substrate, a plurality of first electrodes 101 arranged on the first substrate 100 on each lens region basis, a second electrode 201 formed over the entire surface of the second substrate 200, voltage signal sources Vmin, V1, V2, ... Vmax to apply different voltages to the respective first electrodes 101, and a liquid crystal layer 300 filled between the first substrate 100 and the second substrate 200.

Here, the plurality of first electrodes 101 is arranged with different distances between the centers of the neighboring first electrodes 101 in each lens region. For example, of the plurality of first electrodes 101, distances between the centers of the neighboring first electrodes 101, to which relatively high voltages are applied, are shorter than distances between the centers of the neighboring first electrodes 101 to which relatively low voltages are applied.

Accordingly, with the above-described adjustment of the distance between the centers of the neighboring first electrodes 101, the first electrodes 101 in a relatively high voltage applying region are formed to a relatively narrow width and are arranged densely, but the width of the first electrodes 101 and the distance between the centers of the neighboring first electrodes 101 are gradually increased towards a relatively low voltage applying region. Here, the distance between the centers of the neighboring first electrodes 101 can be adjusted by adjusting the width of the first electrodes 101 and/or the distance between the first electrodes 101.

In addition, assuming that the highest voltage is applied to the edge E of the lens region and the lowest voltage is applied to the center O of the lens region L, the distance between the centers of the neighboring first electrodes 101 can be adjusted such that the distance is gradually increased, starting from a minimum value, from the edge E toward the center O of the lens region L. In consideration of the fact that the edge E of the lens region L has a profile sensitive to voltage application, the first electrodes 101 may be densely arranged only at the edge E of the lens region L with a closer distance than the center O of the lens region L.

The first and second electrodes 101 and 201 are made of transparent metals, such as Indium Tin Oxide (ITO) and prevent loss of transmissivity at locations thereof.

With respect to each lens region L, a first voltage Vmin, which is equal to an approximate threshold voltage, is applied to the center O of the lens region L, whereas the highest $n^{th}$ voltage Vmax is applied to the first electrode 101 located at the edge E of the lens region L. In this case, voltages applied to the first electrodes 101, located between the center O and the edge E of the lens region L, range from the threshold voltage Vmin to the $n^{th}$ voltage Vmax of the lens region L, and are gradually increased with increasing distance from the center O of the lens region L. When voltages are applied to the plurality of first electrodes 101, a ground voltage is applied to the second electrode 201 to create a vertical electric field between the first electrodes 101 and the second electrode 201.

The plurality of first electrodes 101 are horizontally symmetrically formed about the edge E of the lens region L. The horizontally symmetrical first electrodes 101 have a short distance between the centers thereof near the edge E and are increased in distance toward the center O.

The respective first electrodes 101 are connected with the corresponding voltage signal sources Vmin, V1, V2, ... Vmax via metal lines 111 in pad regions (corresponding to non-display regions of the display panel 350), to receive desired voltages.

The lowest threshold voltage Vmin, applied to the first electrode 101 located at the center O of the lens region L, is an AC square wave voltage having a peak value of about 1.4~2V. The threshold voltage Vmin is given by $$V = \pi \sqrt{\frac{K1}{\Delta \varepsilon \varepsilon 0}}$$

(where, $\Delta\varepsilon$ is the dielectric constant anisotropy of liquid crystals, K1 is the modulus of elasticity of liquid crystals, and $\varepsilon_0$ is a free-space dielectric constant). In addition, the highest voltage Vmax, applied to the first electrode 101 located at the edge E of the lens region L, is an AC square wave voltage having a peak value of about 2.5~10V.

When voltages, ranging from the above-described threshold voltage (i.e. AC square wave voltage having a peak value of 1.4~2V) to the highest voltage (i.e. AC square wave voltage having a peak value of 2.5~10V), are applied to the plurality of first electrodes 101 provided in the electrically-driven liquid crystal lens 1000 and a ground voltage is applied to the second electrode 201, the electrically-driven liquid crystal lens 1000 functions similar to an optical parabolic lens, thereby transmitting the first and second images IM1 and IM2 from the display panel 350 to first and second viewing zones V1 and V2, respectively. If a distance between the first viewing zone V1 and the second viewing zone V2 is set to a distance between the viewer's eyes, the viewer can combine the first and second images IM1 and IM2 transmitted to the first and second viewing zones V1 and V2, thereby perceiving 3-dimensional images based on binocular disparity.

On the other hand, when no voltage is applied to the first electrodes 101 and second electrode 201, the electrically-driven liquid crystal lens 1000 simply serves as a transparent layer to directly display the first and second images IM1 and IM2 of the display panel 350 without refraction. Accordingly, the first and second images IM1 and IM2 are directly transmitted to the viewer regardless of viewing zones and thus, the viewer perceives 2-dimensional images.

In the drawing, the lens region L of the electrically-driven liquid crystal lens 1000 has the same width as a total width of two pixels P1 and P2 of the display panel 350 located below the electrically-driven liquid crystal lens 1000. As occasion demands, a plurality of pixels may correspond to the lens region L. In addition, the lens region L may be tilted at a predetermined angle with respect to the pixels and, as occasion demands, all the lens regions L may be arranged stepwise with respect to the pixels (more particularly, the lens region of an $n^{th}$ pixel horizontal line is shifted from an $(n+1)^{th}$ pixel horizontal line by a predetermined distance).

The lens region L is defined to have a width corresponding to a pitch P, and the plurality of lens regions L with the same pitch are periodically repeated in a given direction (for example, in a horizontal direction as shown in FIG. 4). Here, "pitch P" means a horizontal width of a single lens region L. It is noted that the lens region L does not have a physical convex-lens shape, but functions as a lens realized when liquid crystals are aligned by an electric field. In FIGS. 3 and 4, a distance between the center O and the edge E of the lens region L is equal to P/2. This means that symmetrical values of voltages are applied to the symmetrical first electrodes 101 from the edge E to the center O of the lens region L.

A first alignment film 102 and a second alignment film 202 are formed, respectively, on the first substrate 100 including the first electrodes 101 and on the second electrode 201. In this case, to allow the electrically-driven liquid crystal lens 1000 to function as a transparent layer in an initial state when no voltage is applied thereto, the first alignment film 102 has the same rubbing direction as the direction of the first electrodes 101, and the second alignment film 202 has a rubbing direction intersecting that of the first alignment film 102. Thereby, the electrically-driven liquid crystal lens 1000 can directly pass images, transmitted from the display panel 350 located below thereof, to the viewer.

The above-described lens regions L exhibit a shape as shown in FIGS. 3 and 4 and are horizontally repeated at the distance of the pitch P.

The plurality of first electrodes 101 has a bar shape and extends along a crosswise direction of the first substrate 100 (in the direction into the drawing) with different widths or distances therebetween. Each of the first electrodes 101 has a width in a range of 2 μm to 30 μm, and a distance between the neighboring first electrodes 101 is in a range from 2 μm to 30 μm. For example, the pitch P as the width of the single lens region can be changed to various values ranging from 90 μm to 1,000 μm and, according to the above-described width and distance of the first electrodes 101, approximately ten to one hundred or more first electrodes can be formed on a per lens region basis.

Although not shown, in the electrically-driven liquid crystal lens 1000 according to the embodiment of the present invention, seal patterns (not shown) are formed at outer peripheral regions of the first and second substrates 100 and 200 (corresponding to non-display regions including pad regions of the display panel 350), to support the first and second substrates 100 and 200. The liquid crystal layer 300 between the first substrate 100 and the second substrate 200 must have a sufficient thickness equal to about 15 μm or more, in order to form a sufficient phase of the electrically-driven liquid crystal lens. To stably maintain the thickness of the liquid crystal layer 300, ball spacers or column spacers can be further provided to support a cell gap between the first substrate 100 and the second substrate 200. In this case, it is advantageous to position the spacers so as not to distort the phase of the electrically-driven liquid crystal lens.

Figure 6:
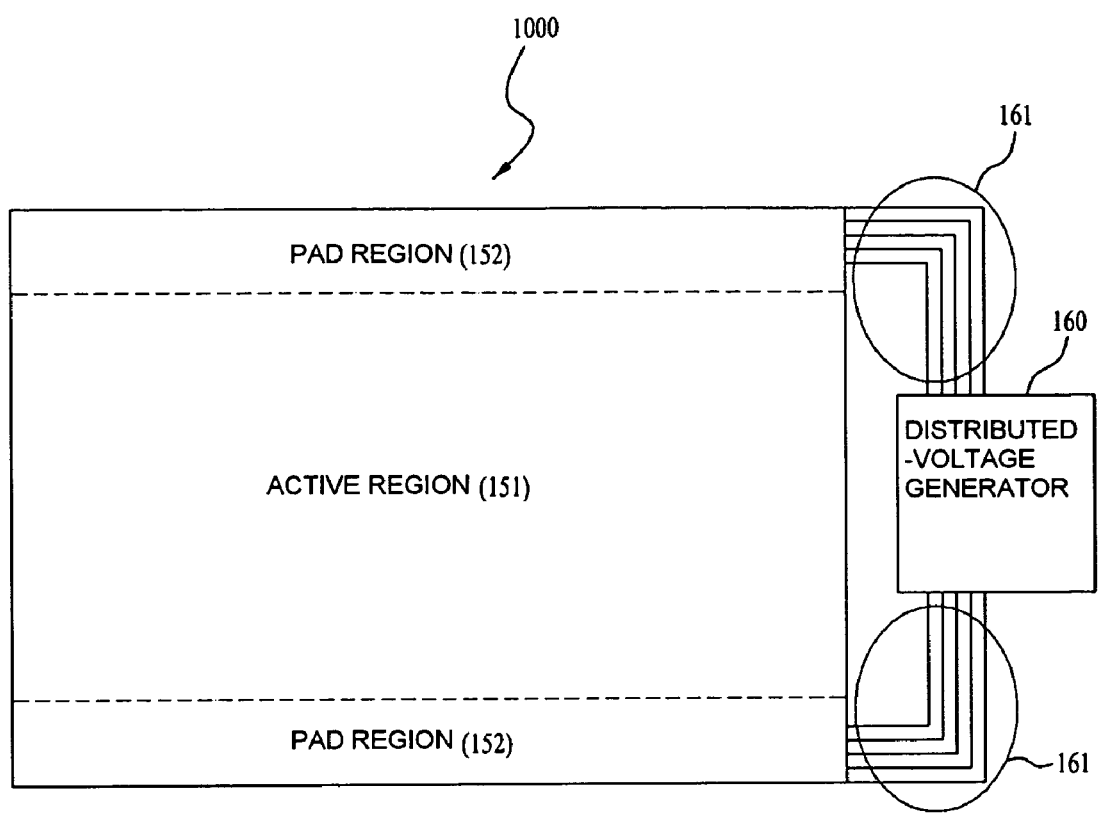
FIG. 6 is a schematic view illustrating a voltage application configuration of the electrically-driven liquid crystal lens according to the present invention.
Figure 7:
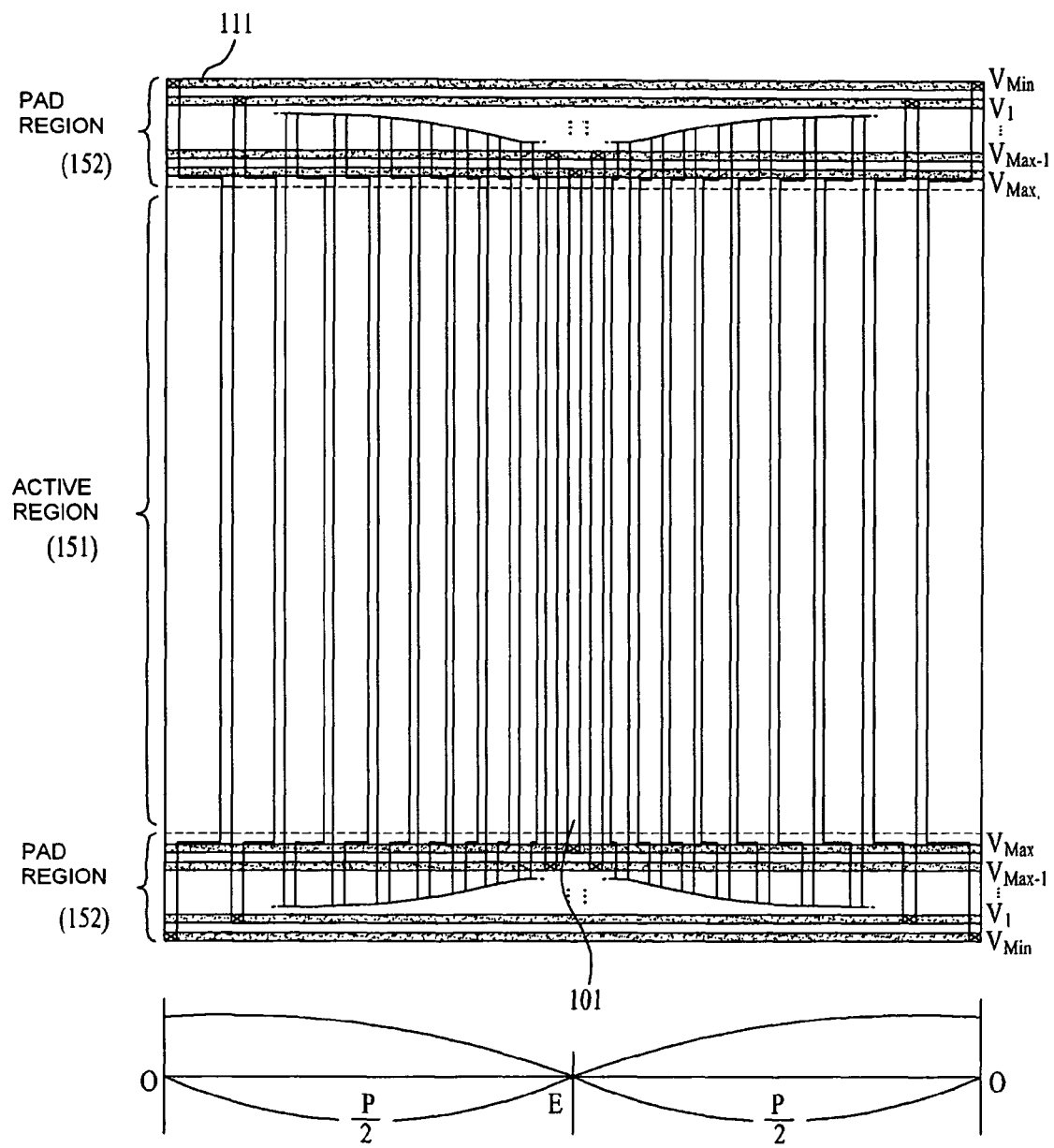
FIG. 7 is a plan view illustrating a first substrate of the electrically-driven liquid crystal lens according to the present invention.
Figure 8:
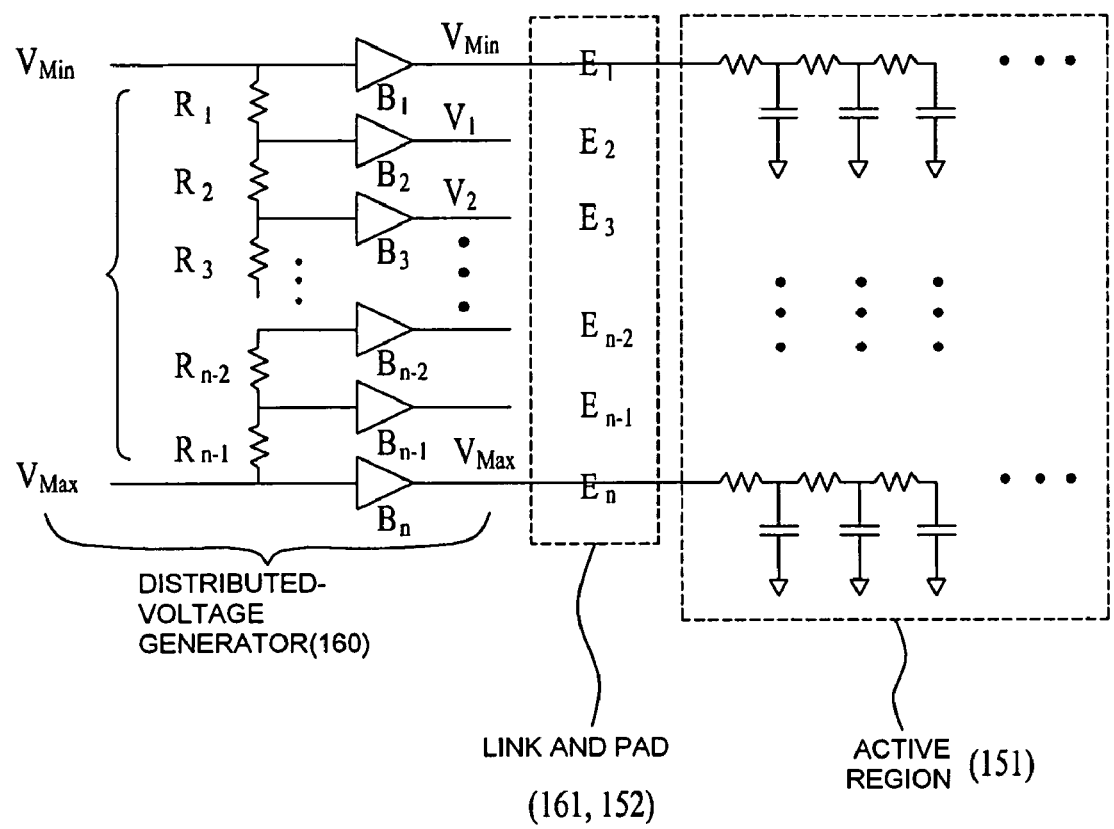
FIG. 8 is a block diagram illustrating a voltage application manner according to the present invention.

FIG. 6 is a schematic view illustrating a voltage application configuration of the electrically-driven liquid crystal lens of FIG. 3, FIG. 7 is a plan view illustrating a first substrate of the electrically-driven liquid crystal lens according to the present invention, and FIG. 8 is a block diagram illustrating a voltage application manner according to the present invention.

As shown in FIGS. 6 and 8, the electrically-driven liquid crystal lens of the present invention includes an active region 151 as a display region, and pad regions 152 in which voltage signals are applied to the first electrodes 101 and the second electrode 201 arranged in the active region 151.

The pad regions 152 are provided with a voltage source to apply voltage signals from an external station to the electrodes. The voltage source is a distributed-voltage generator 160 provided at the outside of the first substrate 100. The distributed-voltage generator 160 serves to generate voltages to be applied to the first electrodes 101 as split electrodes. To achieve a plurality of different voltage outputs E1, E2, ..., En−1 and En, the distributed-voltage generator 160 includes input terminals for maximum and minimum voltages Vmax and Vmin, resistors R1, R2, ..., Rn−1 between the maximum and minimum voltage input terminals and voltage output terminals, and buffers B1, B2, ..., Bn provided at nodes for voltage outputs E1, E2, ..., En−1 and En. In this case, the magnitude of resistances R1, R2, ... Rn−1, output between the respective voltage output terminals for minimum and maximum voltages Vmax and Vmin and other different voltages therebetween, can be adjusted according to magnitude of the distributed voltages. The voltages, applied to the respective first electrodes 101, are gradually decreased from the edge E to the center O of the lens region L. These voltages can be adjusted according to the magnitude of resistances.

Here, either end of each first electrode 101 comes into contact with at least one of the metal lines 111 formed in the pad region, to which a total of n voltage signals from the first voltage Vmin to the $n^{th}$ voltage Vmax are applied. In this case, the contact between the first electrodes 101 and the metal lines 111 is achieved via contact-holes formed in a protective layer (not shown) interposed between the first electrodes 101 and the metal lines 111.

In FIG. 7, assuming that a total of n first electrodes are provided between the edge E and the center O of the lens region, 2n−1 metal lines 111 are formed in each of the pad regions 152 located above and below the active region 151. With respect to a total of n metal lines 111 between the edge E of the lens region L (the center of the drawing) and the center O of the lens region L (the left or right side of the drawing) in the lower pad region 152, voltages ranging from the first voltage Vmin to the $n^{th}$ voltage Vmax are applied starting from the lowermost metal line 111 to the $n^{th}$ metal line 111. Also, with respect to a total of n metal lines 111 between the center O of the lens region L (the left or right side of the drawing) and the edge E of the lens region L (the center of the drawing) in the upper pad region 152, voltages ranging from the first voltage Vmin to the $n^{th}$ voltage Vmax are sequentially applied starting from the uppermost metal line 111. In this case, on the basis of the edge E of the lens region L, more particularly, on the basis of the first electrode 101 corresponding to the edge E and the metal line 111 in contact with the first electrode 101, symmetrical voltage signals decreasing from the $n^{th}$ voltage Vmax to the first voltage Vmin are applied to the metal lines 111. The respective first electrodes 101 are sequentially brought into contact with the metal lines 111, such that voltages gradually decreasing from the edge E to the center O of the lens region L are applied to the first electrodes 101. In this case, the first electrodes 101 and the metal lines 111 are brought into contact with each other.

Here, the plurality of first electrodes 101 in the lens region L has different widths. Also, the widths of the first electrodes 101 located in the active region 151 are gradually increased from the edge E to the center O of the lens region L, but ends of the respective first electrodes 101 corresponding to the pad regions 152 have the same or similar width and have contacts with the metal lines 111 to which the corresponding voltages are applied. In this case, the relatively large width of the first electrode 101 located at the center O of the lens region L is reduced at the ends of the first electrode 101 in the pad regions 152, to reduce a contact area between the first electrode 101 and the metal lines 111 intersecting with each other except for the contacts. This can reduce a reduced resistance at the intersections. It will be appreciated from FIG. 7 that the widths of the respective first electrodes 101 are decreased to a similar degree prior to entering the pad regions 152, whereby the first electrodes 101 overlap the metal lines 111 with a reduced area except for the contacts, preventing an unwanted increase in the resistance of the first electrodes 101.

The plurality of first electrodes 101 have a bar shape extending in a given direction in parallel. The metal lines 111 are arranged in the pad regions 152 to extend in a direction perpendicular to the first electrodes 101. The widths of the first electrodes are adjusted such that the intersections with the metal lines 111 in the pad regions 152 have an appropriate parasitic capacitance.

FIGS. 6 and 7 illustrate a state wherein the first electrodes 101 are formed on a surface of the first substrate 100.

In FIG. 8, voltages to be applied to the first electrodes are calculated according to different distances from the edge or center of the lens region and a phase difference of liquid crystals based on voltage application. In this case, creation of different voltages between the maximum voltage Vmax and the minimum voltage Vmin can be accomplished by the distributed-voltage generator 160. The distributed-voltage generator 160 includes the plurality of resistors R1, R2, ..., Rn−2 and Rn−1 provided between the voltage signal sources for the maximum and minimum voltages Vmax and Vmin and other voltages therebetween and used to distribute voltages to be applied to the respective first electrodes, nodes set between the plurality of resistors R1, R2, ..., Rn−2 and Rn−1, and the buffers B1, B2, ..., Bn−1 and Bn to stabilize the outputs E1, E2, ..., En−1 and En from the nodes. As connecting lines between the buffers and the voltage signal sources Vmin, V1, ..., Vmax−1 and Vmax are connected with the metal lines 111 in the pad regions 152, the distributed voltages are finally applied to the first electrodes 101 in the active region 151.

Current flowing through the distributed-voltage generator 160 is set to several milliamperes. If the current is excessively low, a drive voltage deviation increases, causing the respective nodes to output unstable levels of voltages. If the current is excessively high, the resistors in the distributed-voltage generator cause unnecessary thermal electricity consumption. Therefore, it is preferred to determine a desired current value in consideration of the drive voltage deviation and thermal electricity consumption in the distributed-voltage generator.

Voltage signals Vmin, Vi, . . . , Vmax output from the distributed-voltage generator 160 are applied to the metal lines 111 in the pad regions 152, and the metal lines 111 have contacts with the ends of the first electrodes 101. In this case, the number of voltage signals output from the distributed-voltage generator 160 is equal to the number of first electrodes 101 located between the edge E and the center O of each lens region L. Also, the voltage signals output from the distributed-voltage generator 160 between the center O and the edge E of the lens region L correspond to a positive quadratic function on the basis of the center O of the lens region.

For example, an appropriate voltage to be applied can be selected using a Table wherein a phase difference of a liquid crystal layer is calculated on an applied voltage basis. That is, if an electrically-driven liquid crystal lens simulated according to the relationship between the applied voltage and the phase difference is similar to a desired simulation, an associated Table is selected and voltage values at different electrode positions of the lens region are calculated.

Alternatively, the pad region 152 may be formed only at one side of the active region 151. In the case of a small-size model, one end of an electrode exhibits a gentle voltage drop and thus, the above-described configuration of a single pad region is possible. Although FIG. 7 illustrates that each metal line comes into contact with two first electrodes except for the edge of the lens region, n metal lines equal in number to the first electrodes in each lens region may be obliquely formed in each of the upper and lower pad regions and n contacts may be produced between the metal lines and the first electrodes.

To achieve the function of a parabolic lens, the electrically-driven liquid crystal lens of the present invention must be configured such that the voltages to be applied to the plurality of first electrodes are gradually decreased from the edge to the center of the lens region. Specifically, with respect to a phase difference (corresponding to the ordinate in FIG. 10B), a low voltage must be applied to a large phase difference region (corresponding to the center O of the lens region), and a high voltage must be applied to a small phase difference region (corresponding to the edge E of the lens region). That is, the applied voltage and phase difference are inversely proportional to each other.

As the applied voltages are decreased from the maximum voltage Vmax to the minimum voltage Vmin from the edge to the center of the lens region, the voltages are symmetrical at the left and right edges on the basis of the center of each lens region. Specifically, assuming that the center corresponds to a zero point and the left and right edges correspond to (−) and (+) coordinates of the abscissa, an applied voltage V is defined by a value proportional to the square of a distance x from the center.

As described above, the voltages to be applied to the first electrodes (or first and second split electrodes) correspond to a positive quadratic function proportional to a distance from the center to the edge, and can be adjusted by the distributed-voltage generator 160 within a range of the maximum and minimum voltages Vmax and Vmin. In this case, the distributed-voltage generator 160 includes the plurality of resistors to distribute the voltages to be applied to the first electrodes between the maximum and minimum voltage signal sources and nodes set between the plurality of resistors. The metal lines 111 are connected to the nodes, to apply the voltages from the nodes to the first electrodes.

Figure 9:
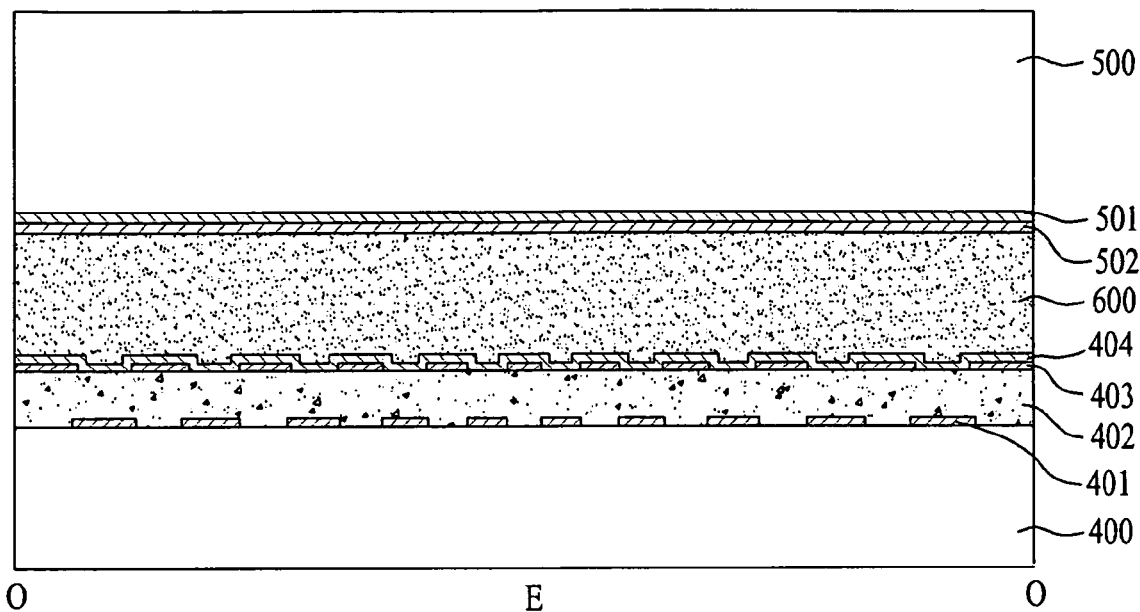
FIG. 9 is a sectional view illustrating an electrically-driven liquid crystal lens according to a second embodiment of the present invention.

FIG. 9 is a sectional view illustrating an electrically-driven liquid crystal lens according to a second embodiment of the present invention.

As shown in FIG. 9, the electrically-driven liquid crystal lens according to the second embodiment of the present invention includes a plurality of first split electrodes 401 and second split electrodes 403, which are formed on different layers, i.e. formed on a first substrate 400 and an insulating film 402, respectively. The first split electrodes 401 and second split electrodes 403 are alternately arranged. Accordingly, when viewed from the upper side of the first substrate 400 in plan, it is preferred that the first and second split electrodes 401 and 403 occupy the entire surface of the first substrate 400. This eliminates any empty region of the first substrate 400 not occupied by the first or second split electrodes 401 or 403. Such a uniform arrangement of the first and second split electrodes 401 and 403 assures a gentle phase plane of the electrically-driven liquid crystal lens.

The first and second split electrodes 401 and 403 formed on the first substrate 400 and insulating film 402 are arranged with an increasing width and distance from the edge to the center of the lens region. Here, the first split electrodes 401 or second split electrodes 402 are arranged on the corresponding layer such that a distance between the centers of the neighboring electrodes is gradually increased from the edge to the center of the lens region. This arrangement is possible by increasing the width of the electrodes and/or the distance between the electrodes.

This embodiment wherein the first and second split electrodes 401 and 403 are arranged on the first substrate 400 and insulating film 402 is applicable to situations that a large number of electrodes are required for a lens region pitch and it is difficult to arrange the electrodes on a single layer with a desired distance. That is, the first insulating film 402 or a plurality of insulating films may be formed on the first substrate 400, to distribute the electrodes on the first substrate 400 and the plurality of insulating films including the insulating film 402. Here, the plurality of first and second split electrodes 401 and 403 on the first substrate 400 or on the plurality of insulating films 402 are horizontally symmetrical about the edge E of the lens region L.

Although not described, in the drawings, reference numeral 404 represents a first alignment film, reference numeral 500 represents a second substrate, and reference numerals 501 and 502 represent a second electrode and a second alignment film, respectively. Also, reference numeral 600 represents a liquid crystal layer. These constituent elements have the same functions as those of the above-described first embodiment, and a description thereof will be omitted.

With the above-described second embodiment wherein the first and second split electrodes 401 and 403 are arranged on the first substrate 400 to occupy the entire surface of the first substrate 400 when viewed in plan, voltages can be applied with a more fine interval, realizing a more gentle phase plane of an electrically-driven liquid crystal lens than the previously described first embodiment.

Figure 10A:
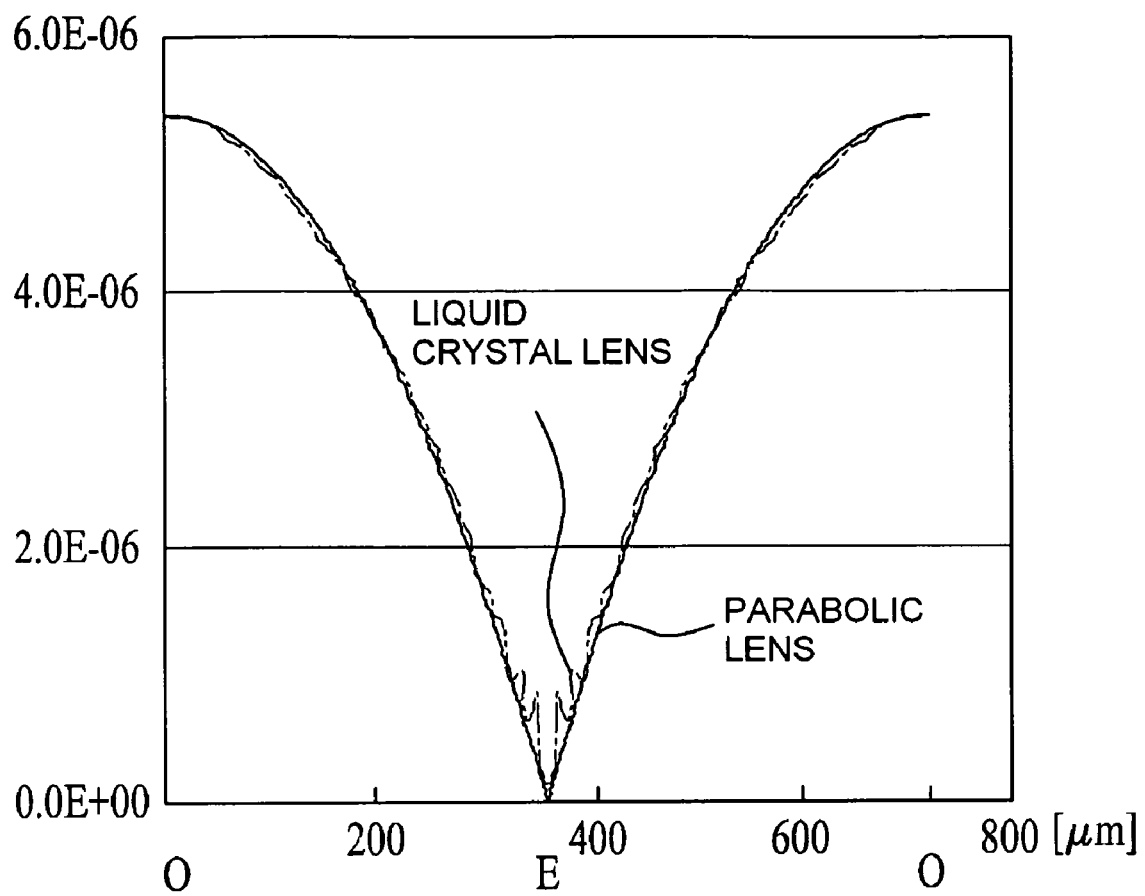
FIGS. 10A and 10B are graphs illustrating the phase of the electrically-driven liquid crystal lens with respect to the same pitch and difference pitches of first electrodes as split electrodes.
Figure 10B:
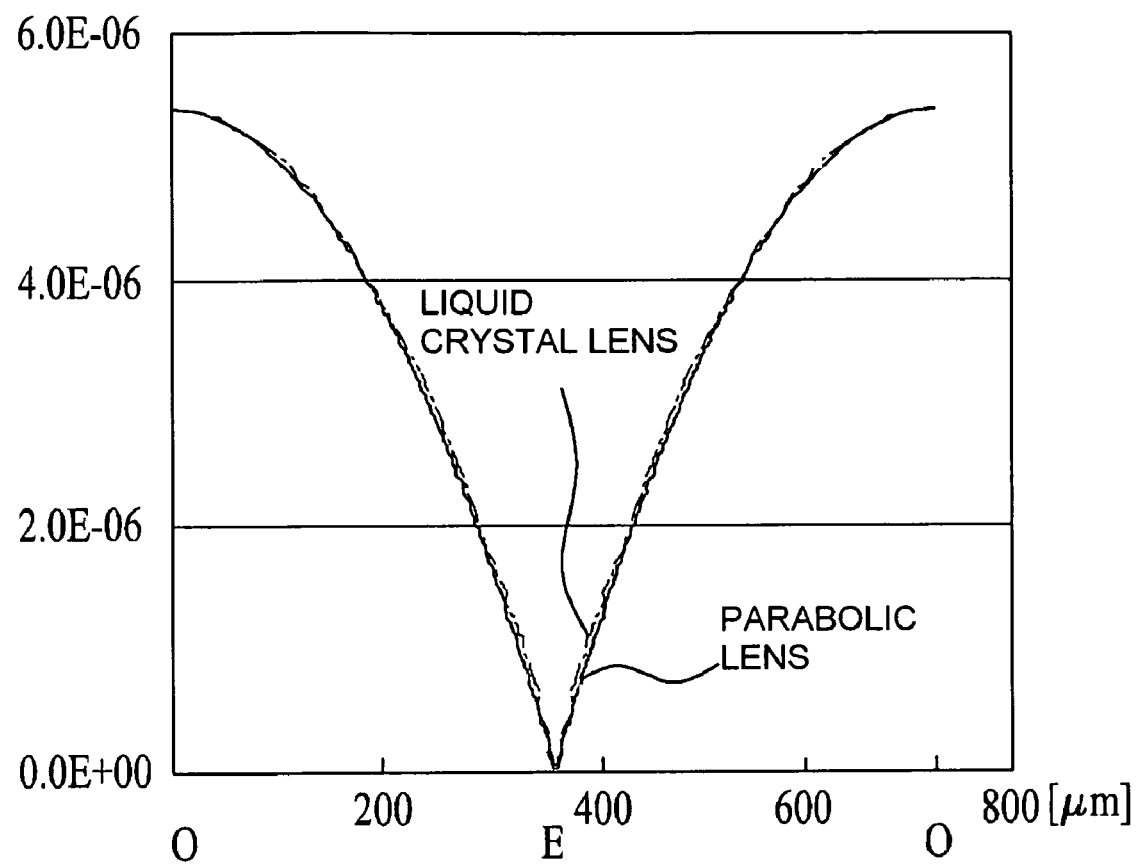

FIGS. 10A and 10B are graphs illustrating the phase of the electrically-driven liquid crystal lens with respect to the same pitch or difference pitches of the first split electrodes.

FIG. 10A compares the electrically-driven liquid crystal lens defined when voltages are applied to the first split electrodes having the same width and the same distance with a general parabolic lens. FIG. 10B compares the electrically-driven liquid crystal lens, in which the first and second split electrodes are arranged with an increasing width and distance from the edge to the center of the lens region, with a general parabolic lens.

Both FIGS. 10A and 10B, for example, illustrate simulation results of a 42-inch display panel. In this case, display of 9 views per lens region is possible.

In the experiment of FIG. 10A, the first electrodes having the same width of 15 μm were arranged on the first substrate with a distance of 15 μm. In the experiment of FIG. 10B, the first electrodes were arranged by the width and distance of 15 μm at the center of the lens region and by the width and distance of 5 μm at the edge of the lens region.

As a result of comparing the electrically-driven liquid crystal lens realized from the respective experiments, it was found that the electrically-driven liquid crystal lens of FIGS. 10A and 10B have a profile substantially similar to a general parabolic lens at the center of the lens region, but the electrically-driven liquid crystal lens of FIG. 10A wherein the first electrodes having the same width are equidistantly arranged exhibits serious distortion at the edge of the lens region.

On the other hand, it was found that the electrically-driven liquid crystal lens of FIG. 10B wherein the first electrodes (or first and second split electrodes) having different widths are arranged by different distances exhibits a lens profile substantially consistent with a general parabolic lens regardless of the edge or the center of the lens region.

From the electrically-driven liquid crystal lens of the present invention wherein split electrodes having different widths are arranged with difference distances, the following effects can be analogized.

When a single electrode is formed throughout a substrate at the edge of a lens region, the single electrode having a predetermined width is difficult to provide a uniform voltage throughout the edge and the center of the lens region and easily causes distortion in a lens phase plane. To solve this problem, providing the lens region with a plurality of split electrodes was contemplated. However, when the split electrodes having the same width are equidistantly arranged, there still exists the risk of electric field distortion in the vicinity of electrodes to which high voltages of a steep electric field are applied, resulting in distortion in the edge shape. Although it is possible to eliminate crosstalk due to electric field distortion led by covering the edge with a black matrix layer, the arrangement of the black matrix layer may cause an unwanted reduction in opening ratio.

The electrically-driven liquid crystal lens of the present invention is devised in consideration of the fact that the edge of the lens region is sensitive to voltage application and thus, undergoes serious distortion when a high voltage of a steep electric field is applied thereto. Accordingly, the electrically-driven liquid crystal lens has a feature in that the width and distance of electrodes are reduced at the edge of the lens region as compared to the other region (more particularly, the center of the lens region). With different widths and distances of electrodes in each lens region, the electrodes having a reduced width can be arranged more densely in a region sensitive to an electric field, thereby achieving a gentle distortion-free profile throughout the edge and center of the lens region. Accordingly, the electrically-driven liquid crystal lens of FIG. 10B can achieve a gentle lens plane capable of eliminating crosstalk that has been caused by an irregular lens plane at the edge as observed from FIG. 10A.

As apparent from the above description, an electrically-driven liquid crystal lens and a stereoscopic display device using the same according to the present invention have the following effects.

First, in a related art electrically-driven liquid crystal lens wherein an electrode is formed only on a partial region of a lower substrate, the greater the distance from the electrode, horizontal electric field has no effect on a vertical electric field of the electrode and thus, adjusting alignment of liquid crystals at a region distant from the electrode, i.e. at the center of the lens region is difficult. However, the electrically-driven liquid crystal lens of the present invention is configured in such a way that electrodes are formed throughout the lens region by predetermined distances and different voltages are applied to the respective electrodes such that, for example, the highest voltage is applied to the edge of the lens region and the voltages are gradually decreased toward the center of the lens region. With this configuration and voltage application, the electrically-driven liquid crystal lens can achieve a gentle and smooth parabolic lens plane in the lens region.

Second, as a result of arranging the electrodes more densely at the edge of the lens region and gradually increasing the width and distance of the electrodes toward the center of the lens region, a greater number of electrodes can be arranged at the edge that is sensitive to voltage application. Accordingly, the electrically-driven liquid crystal lens of the present invention can provide a more gentle lens plane at the edge of the lens region, thereby preventing crosstalk that is mainly caused by an irregular lens plane at the edge.

Third, in the electrically-driven liquid crystal lens wherein the plurality of electrodes are arranged on a single layer or on a plurality of insulating layers (or substrates) in a single lens region and voltages are applied to the respective electrodes to drive a liquid crystal layer, arranging the electrodes throughout the lens region can prevent an electric field from exhibiting an excessively strong or weak strength at different positions. Accordingly, even in the case of a large-area display device, a gentle electric field required to drive the liquid crystal layer can be created, providing the electrically-driven liquid crystal lens with functions of a gentle parabolic lens.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrically-driven liquid crystal lens comprising:
    first and second substrates arranged opposite each other and each defining an active region including a plurality of lens regions and a pad region at the outer side of the active region;
    a plurality of first electrodes formed in one direction in parallel, and symmetrically formed about the edges of each lens region on the first substrate to correspond to each lens regions, wherein the first electrodes spaced apart from one another by smaller distances between the centers of the neighboring first electrodes at the edges of each lens region and by larger distances between the centers of the neighboring first electrodes at the centers of the each lens region;
    a second electrode formed over the entire surface of the second substrate;
    a voltage source to apply different voltages which are gradually decreased from the edges to the centers of the each lens region to the plurality of first electrodes and to apply a ground voltage to the second electrode; and
    a liquid crystal layer filled between the first substrate and the second substrate.

2. The lens according to claim 1, wherein a width of the first electrodes is gradually increased from a relatively high voltage applying region to a relatively low voltage applying region.

3. The lens according to claim 1, wherein the distance between the first electrodes is gradually increased from a relatively high voltage applying region to a relatively low voltage applying region.

4. The lens according to claim 1, wherein the voltage source includes a distributed-voltage generator to create different voltages upon receiving minimum and maximum voltages applied thereto, in order to apply the different voltages to the plurality of first electrodes.

5. The lens according to claim 4, further comprising:
a plurality of metal lines provided in the pad region,
wherein voltage signals, output from the distributed-voltage generator, are applied to the plurality of metal lines in the pad region, respectively, and the plurality of metal lines have contacts with ends of the plurality of first electrodes.

6. The lens according to claim 5, wherein the metal lines are formed in the pad region to intersect with the first electrodes, each of the metal lines having a contact with at least one of the plurality of first electrodes.

7. The lens according to claim 4, wherein the number of voltage signals output from the distributed-voltage generator is equal to the number of the first electrodes located between the edge and the center of each lens region.

8. The lens according to claim 7, wherein the voltage signals output from the distributed-voltage generator correspond to a positive quadratic function based on the center of each lens region.

9. The lens according to claim 4, wherein the distributed-voltage generator includes:
resistors provided between maximum and minimum voltage input terminals and voltage signal output terminals, to distribute voltage signals between maximum and minimum voltages; and
buffers between the respective voltage signal output terminals and the metal lines in the pad region.

10. The lens according to claim 1, wherein the plurality of first electrodes is formed on the first substrate in the same layer.

11. The lens according to claim 1, further comprising:
at least one insulating film formed on the first substrate.

12. The lens according to claim 11, wherein the plurality of first electrodes is formed on the first substrate and on the insulating film such that the first electrodes are horizontally symmetrical on the basis of the edge in each lens region.

13. The lens according to claim 1, wherein the plurality of first electrodes have a bar shape extending in a crosswise direction of the first substrate, and a width of the first electrodes and a distance between the neighboring first electrodes are variable in a range of 2 μm to 30 μm.

14. The lens according to claim 1, further comprising:
a first alignment film formed on the first substrate including the plurality of first electrodes; and
a second alignment film formed on the second electrode.

15. The lens according to claim 14, wherein the first alignment film has the same rubbing direction as a longitudinal direction of the first electrodes, and the second alignment film has a rubbing direction intersecting with the rubbing direction of the first alignment film.

16. The lens according to claim 1, wherein the first and second electrodes are made of transparent electrodes.

17. A stereoscopic display device comprising:
an electrically-driven liquid crystal lens including first and second substrates arranged opposite each other and each defining an active region including a plurality of lens regions and a pad region at the outer side of the active region, a plurality of first electrodes formed in one direction in parallel and symmetrically formed about the edges of the each lens region on the first substrate to correspond to the respective lens regions, a second electrode formed over the entire surface of the second substrate, a voltage source to apply voltages which are gradually decreased from the edges to the centers of the lens centers to the plurality of first electrodes and to apply a ground voltage to the second electrode and a liquid crystal layer filled between the first substrate and the second substrate,
wherein the first electrodes are spaced apart from one another by smaller distances between the centers of the neighboring first electrodes at the edges of each lens region and by larger distances between the centers of the neighboring first electrodes at the centers of the each lens region; and
a display panel provided below the electrically-driven liquid crystal lens, to transmit 2-dimensional image signals to the electrically-driven liquid crystal lens,
wherein the voltage source adjusts On/Off of voltages to be applied to the first and second electrodes.

* * * * *